US009858632B1

(12) United States Patent
Shipman, Jr. et al.

(10) Patent No.: US 9,858,632 B1
(45) Date of Patent: Jan. 2, 2018

(54) AUTOMATED RESIDENT CHECK-INS IN CONTROLLED-ENVIRONMENT AREAS USING BIOMETRIC IDENTIFICATION

(71) Applicant: Tech Friends, Inc., Jonesboro, AR (US)

(72) Inventors: Bobby L. Shipman, Jr., Jonesboro, AR (US); Mark A. Haney, Jonesboro, AR (US)

(73) Assignee: Tech Friends, Inc., Jonesboro, AR (US)

( * ) Notice: Subject to any disclaimer, the term of this patent is extended or adjusted under 35 U.S.C. 154(b) by 0 days.

(21) Appl. No.: 15/252,695

(22) Filed: Aug. 31, 2016

(51) Int. Cl.
| | | |
|---|---|---|
| *G05B 19/00* | (2006.01) | |
| *G05B 23/00* | (2006.01) | |
| *G06F 7/00* | (2006.01) | |
| *G06F 7/04* | (2006.01) | |
| *G06K 9/00* | (2006.01) | |
| *G06T 1/00* | (2006.01) | |
| *G06T 7/00* | (2017.01) | |
| *G08B 29/00* | (2006.01) | |
| *G08C 19/00* | (2006.01) | |
| *H04B 1/00* | (2006.01) | |
| *H04B 3/00* | (2006.01) | |
| *H04Q 1/00* | (2006.01) | |
| *H04Q 9/00* | (2006.01) | |
| *G06Q 50/26* | (2012.01) | |

(Continued)

(52) U.S. Cl.
CPC ......... *G06Q 50/26* (2013.01); *G06Q 10/1091* (2013.01); *G07C 9/00158* (2013.01)

(58) Field of Classification Search
CPC . G06Q 50/26; G06Q 10/1091; G07C 9/00158
See application file for complete search history.

(56) References Cited

U.S. PATENT DOCUMENTS

| | | |
|---|---|---|
| 8,370,206 B2 | 2/2013 | Collins |
| 9,113,131 B1 | 8/2015 | Passe et al. |

(Continued)

OTHER PUBLICATIONS

Law Enforcement Development Group, "Applications of Semi-Automatic Speaker Identification Techniques", Mar. 1975, pp. 120, The Aerospace Corporation.

*Primary Examiner* — Erin File
(74) *Attorney, Agent, or Firm* — Schrantz Law Firm, PLLC; Stephen D. Schrantz (57) ABSTRACT

Systems and methods for automated check-in of controlled-environment facility residents, such as correctional facility inmates, employs at least one biometric capture device or mechanism disposed within a controlled-environment area configured to capture biometrics of residents of the controlled-environment facility within the controlled-environment area. A controlled-environment facility administration and management system, or the like, is configured to enroll key biometric identification biometric features of residents of the controlled-environment facility and compare captured biometrics of the residents to enrolled key biometric features of residents of the controlled-environment facility to identify the resident. Whereupon, the controlled-environment facility administration and management system, or the like, logs the presence of an identified resident as in the controlled-environment area at a time the biometrics of the identified resident were captured.

30 Claims, 3 Drawing Sheets

(51) Int. Cl.
*G06Q 10/10* (2012.01)
*G07C 9/00* (2006.01)

(56) References Cited

U.S. PATENT DOCUMENTS

| | | | |
|---|---|---|---|
| 2004/0133804 A1* | 7/2004 | Smith | G06Q 10/10 713/186 |
| 2009/0076832 A1* | 3/2009 | Collins | G06Q 10/00 705/1.1 |
| 2011/0213618 A1* | 9/2011 | Hodge | G07F 19/20 705/1.1 |
| 2012/0154117 A1* | 6/2012 | Nice | G06F 21/32 340/5.82 |
| 2016/0170975 A1* | 6/2016 | Jephcott | A61B 5/7465 704/3 |

\* cited by examiner

AUTOMATED RESIDENT CHECK-INS IN CONTROLLED-ENVIRONMENT AREAS USING BIOMETRIC IDENTIFICATION

TECHNICAL FIELD

The present disclosure relates generally to controlled-environment facilities, more particularly to check-in of residents in controlled-environment areas, and particularly to automated resident check-ins in controlled-environment areas using biometric identification.

BACKGROUND

Various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), day care centers, babysitter arrangements, child care facilities, elder day care facilities or sites, and the like.

For example, inmates convicted of felony offenses generally serve long sentences in prison (e.g., federal or state prisons), whereas those convicted of misdemeanors receive shorter sentences to be served in jail (e.g., county jail). In either case, while awaiting trial, a suspect or accused may remain incarcerated.

In controlled-environment facilities, correctional facilities for example, inmates are traditionally visually identified multiple times per day to ensure that no person has escaped. These inmate counts are extremely time consuming and expensive for correctional facilities and provide little in the way of documentary proof of an inmate's presence. It is possible for an officer to simply overlook a person during a visual inspection, mistake one inmate for another, or even collude with a prisoner to allow an escapee time to flee the area. Also, due to the extreme time involved, inmate identification and check-ins are only done periodically which gives ample time for escapees to run away before the next scheduled check-in count. Moreover, over the past several years, sharp increases in inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often pressed to perform basic tasks such as inmate counts.

SUMMARY

The present invention is directed to systems and methods which provide for automated check-in for controlled-environment facility residents, such as correctional facility inmates. Therein, at least one biometric capture device disposed within a controlled-environment area, i.e. in an area in or associated with a controlled-environment facility. This biometric capture device may be configured to capture biometrics of residents of the controlled-environment facility within the controlled-environment area. A controlled-environment facility administration and management system, or the like, is configured to enroll key biometric identification features of residents of the controlled-environment facility and compare captured biometrics of the residents to enrolled key biometric features of residents of the controlled-environment facility to identify the resident. Whereupon the controlled-environment facility administration and management system, or the like, logs the presence of an identified resident as in the controlled-environment area at a time the biometrics of the identified resident were captured.

Mug shots of the residents of the controlled-environment facility may be used to enroll key biometric identification features of residents of the controlled-environment facility and/or key features of residents of the controlled-environment facility may be enrolled during a defined enrollment process. Such a defined enrollment process may be carried out at intake of the resident into the controlled-environment facility and/or may be an automated enrollment carried out by a controlled-environment facility resident communications kiosk and/or a personal controlled-environment facility resident media device hosting the biometric capture device disposed in the controlled-environment area.

Hence, a biometric capture device disposed in a controlled-environment area may be a part of a controlled-environment facility resident communications kiosk and/or may be mobile and a part of a personal controlled-environment facility resident media device. Therein, the controlled-environment facility resident communications kiosk and/or the personal controlled-environment facility resident media device may carry out comparing captured biometrics of the resident to enrolled key biometric features of residents of the controlled-environment facility to identify the resident. Also, the controlled-environment facility resident communications kiosk and/or the personal controlled-environment facility resident media device may log the presence of the resident whose biometrics were captured as in the controlled-environment area, with the controlled-environment facility administration and management system.

The capture of the biometrics of a resident of the controlled-environment facility may be carried out during a check-in procedure, wherein the resident presents his or her self to the biometric capture device. Again, the biometric capture device may be a part of a controlled-environment facility resident communications kiosk or a part of a personal controlled-environment facility resident media device. In this aspect, logging the presence of the resident whose biometrics were captured as in the controlled-environment area may include logging other biometric information of the resident and the resident's physical location within the controlled-environment area.

Also, capturing biometrics of residents of the controlled-environment facility using the biometric capture device disposed in the controlled-environment area may be carried out on a continual basis, and logging presence of residents captured in the biometrics as being in the controlled-environment area may be carried out periodically. A prompt may be issued for a resident to present his or her self to a biometric capture device. This prompt may be issued in response to the resident not having a valid check-in logged within a predefined period, and/or this the prompt may be issued at specified intervals according to facility rules. This prompt may be an email, text, alarm, phone call, other electronic, optical or acoustic signals, etc., issued to a controlled-environment facility resident communications kiosk in the controlled-environment area and/or a personal controlled-environment facility resident media device of the resident. Additionally or alternatively, the prompt may be an announcement issued over a public address system of the controlled-environment facility, or the like.

In some embodiments, an alert may be issued to an official associated with the controlled-environment facility in response to facility rules for required check-ins being violated with respect to a subject inmate. These alerts may take the form of an email, text, alarm, and/or phone call issued to the official.

Additionally or alternatively, key biometric features of officers of the controlled-environment facility may be enrolled and biometrics of an officer of the controlled-environment facility may be captured using a biometric capture device disposed in or in conjunction with the controlled-environment facility and/or various other controlled-environment areas. The captured biometrics of the officer may be compared to enrolled key biometric features of officers of the controlled-environment facility to identify the officer and the presence of the identified officer may be logged as in the vicinity of the biometric capture device at a time the biometrics were captured. A report of where the identified officer was at predetermined times may be generated therefrom.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods relate generally to controlled-environment facilities, more particularly to check-in of residents in controlled-environment areas, and particularly to automated resident check-ins in controlled-environment areas using biometric identification. In accordance with embodiments of the present systems and methods for automated check-in of controlled-environment facility residents, such as correctional facility inmates, at least one biometric capture device or mechanism disposed within a controlled-environment area is employed to capture biometrics of residents of the controlled-environment facility in the controlled-environment area. Such biometrics may include the resident's image, a recording of the resident's voice, a fingerprint scan, a thumbprint scan, a palm scan, an iris scan, or the like. Embodiments of the present automated check-in of inmates of correctional facilities may use biometrics capture capabilities, such as video and/or digital image capture and/or sound recording capabilities, of controlled-environment facility resident communications kiosks and/or personal resident media devices. A controlled-environment facility administration and management system, or the like, is configured to pre-enroll key biometric identification features of residents of the controlled-environment facility and compare captured biometrics of the residents to enrolled key features of residents of the controlled-environment facility to identify the resident. Whereupon the controlled-environment facility administration and management system, or the like, logs the presence of an identified resident as in the controlled-environment area at a time the biometrics of the identified resident were captured.

Embodiments of the present systems and methods address the burden placed on correctional facilities to provide timely resident check-ins by improve the frequency and quality of resident counts while lowering costs. In accordance with embodiments of the present systems and methods a biometric capture device attached to a resident communications kiosk or mobile computing device is placed in a controlled-environment area, such as within a resident housing area, work area, or the like. A resident's key biometric features are identified and stored in a database or file system. This enrollment can be done from a resident's mug shots, other photos, a defined enrollment process, or even an automated enrollment by a kiosk or mobile computing device. Once enrolled, the resident may be required to check-in at periodic intervals. This check-in procedure could take the form of the resident presenting his or her self to a biometric capture device associated with a kiosk or mobile computing device and the device identifying him or her, automatically. The check-in is automatically logged into a facility database, possibly with other biometric information and/or photo as proof of resident identity. The resident's physical location may be logged as well. In some embodiments, the identification system could be fully automatic, constantly scanning the resident's housing, work or other environment, and periodically logging the resident's presence. It may not require active participation from the resident.

In the event a resident does not have a valid check-in for a predetermined period of time, such as may be defined by facility rules, a prompt might be generated in the form of an email, alarm, phone call, other electronic, optical or acoustic signals, etc. to trigger a manual verification of the resident's location.

Embodiments of the present systems and methods can also be used to log and report facility personnel presence within the controlled-environment facility. Often, a controlled-environment facility wants to track personnel, such as, for example, to confirm correctional officer patrols are being performed. Embodiments of the present systems and methods can track such an officer's movements within (and about) a correctional facility and produce reports on where the officer was at particular times throughout the day, in such an example. Embodiments of the present systems and methods can also be used in emergencies to identify the last known location for a person in a controlled-environment facility. For example, during riots, this system could identify which officers were present in dangerous areas of a correctional facility.

Figure 1:
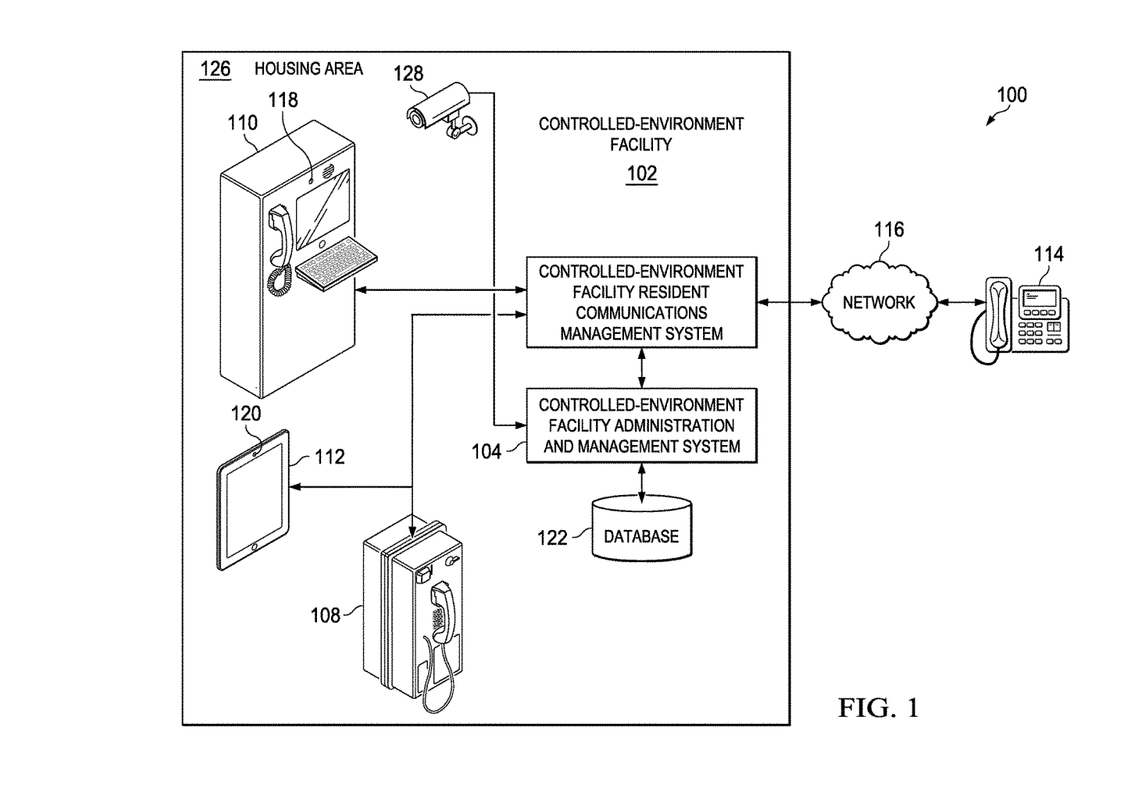
FIG. 1 is a diagrammatic illustration of an example environment, wherein an example embodiment of the present systems and methods for automated resident check-ins in controlled-environment areas using biometric identification may be implemented, in accordance with some embodiments.

FIG. 1 is a diagrammatic illustration of example environment 100, wherein an example embodiment of the present systems and methods for automated resident check-ins in controlled-environment areas using biometric identification may be implemented with respect to controlled-environment facility 102, in accordance with some embodiments. Controlled-environment facility environment 100 may implement the illustrated embodiment of the present systems and methods through controlled-environment facility administration and management system 104, employing aspects of controlled-environment facility resident communications management system 106.

In some embodiments, controlled-environment facility 102 may allow a resident to make or receive phone calls using telephone 108, communications kiosk 110, personal resident media devices 112, or the like, via communication system 106. To that end, communication system 106 may include one or more analog switches, IP gateways, PBX systems, etc. that provide communications to controlled-environment facility 102. For example, a resident within controlled-environment facility 106 may use device 108, 110, 112, etc. to make a telephone call to (or to receive a telephone call from) a non-resident device 114 through network 116, which may be the public switched telephone network (PSTN), the Internet, wireless communications networks, or the like.

Further, residents may use communications kiosks 110, personal resident media devices 112, or the like to send and receive emails with non-residents, carryout video visitations with non-residents, exchange texts, or the like, via communication system 102. To this end, in some embodiments, communications kiosks or video visitation stations 110 may include a display or screen, a camera (118 or 120) and/or microphone, and a speaker and/or audio output. The camera (118 or 120) may be a digital video camera or the like, and may act as a biometric capture device or mechanism in accordance with embodiments of the present systems and methods. The screen may include a liquid crystal display (LCD), or other similar display. In some cases, the screen may include a touchscreen configured to accept data input from a user, and/or a keyboard, or the like, may be provided. Such a touchscreen may also act as a biometric capture device or mechanism to capture fingerprints, palm prints or the like. Additionally or alternatively, each video visitation station/kiosk 110 may include a handset or headset configured to perform audio input and/or output operations. A microphone of the kiosk (and/or handset or headset) may be employed in accordance with embodiments of the present systems and methods as a biometric capture device or mechanism. Moreover, in various embodiments, each video visitation station/kiosk 110 may also include a biometric sensor (e.g., thumbprint scanner, iris scanner, etc.), a radio frequency identification (RFID), a barcode scanner, or the like, for identifying a (resident) user. In some cases, a communications kiosk may assume the form of a computer, tablet computer, smart phone, etc., or any other consumer device or appliance with audio and/or video conferencing capabilities. For example, a tablet computing device may be mounted on a wall, in a hardened case and used as such a kiosk. Communications kiosks may replace typical pay phones found in some facilities and may provide touch screen computer functionality that enables a resident to perform "self-service" tasks such as setting up doctor appointments, scheduling visitation, viewing schedules, and checking the status of his or her case.

Personal resident media devices 112 may be a mobile device, such as a tablet computing devices, smartphones, media players, smart watches, wearable biometric devices, and/or the like, adapted and/or approved for use by residents of controlled-environment facility 106 (i.e. within the correctional facility). Such resident media devices may be particularly adapted for use in a controlled-environment facility, or the like and may be "stripped-down," particularly from the standpoint of what applications programs (apps) are provided or allowed on the device, and/or connectivity afforded the device. By way of example, such a resident media device may employ a modified operating system. For example, such a device may be adapted to only connect to a network provided by the controlled-environment facility, and/or in only certain locations, such as in controlled-environment areas in accordance with embodiments of the present systems and methods. This may be controlled by availability of Wi-Fi access in certain areas, limited location-dependent access to a wireless communications network such as to only implement embodiments of the present systems and methods, or the like. Also, the resident media device may have a few, fixed apps pre-installed on the device, and installation of further apps on the device may be forbidden (i.e. prevented by modifications to the device's operating system, or the like) and/or restricted, such as by requiring permission from a facility administrator, or the like. As noted, in accordance with embodiments of the present systems and methods, personal resident media devices may be used to communicate with others, such as through phone calls, video calls, or the like (under control of controlled-environment facility resident communications management system 106).

Controlled-environment facility administration and management system 104 or similar functionality incorporated into and/or associated with controlled-environment facility environment 100 may electronically monitor and/or censor content of resulting electronic communications, in an automated manner such as for investigative purposes and/or to alleviate controlled-environment facility personnel from doing so, such as performing automated resident check-ins through employment of biometric identification programming, in accordance with embodiments of the present systems and methods.

Controlled-environment facility environment 100 may include, or otherwise associate controlled-environment facility database 122. As illustrated, database 122 may be a part of, or otherwise associated with, controlled-environment facility administration and management system 104. For example, the resident's name, gender, address, date of birth, etc. may be stored in one or more databases (122) maintained by controlled-environment facility administration and management system 104. According to some embodiments, in addition to identification information, biometric samples (e.g., fingerprints, voice prints, iris scans, etc.) may be stored in the one or more databases 122 maintained by controlled-environment facility administration and management system 104, as biometric signatures, such that they may be used to validate the identities of residents and others. Database 122, or the like, may be configured to maintain rules implemented by controlled-environment facility administration and management system 104.

Generally speaking, database(s) 122 may include any suitable type of application or data structure that may be configured as a data repository. For example, database 122 may be configured as a relational database that includes one or more tables of columns and rows and that may be searched or queried according to a query language, such as a version of Structured Query Language (SQL). Alternatively, database 122 may be configured as a structured data store that includes data records formatted according to a markup language, such as a version of eXtensible Markup Language (XML). In other embodiments, database 122 may be implemented using one or more arbitrarily or minimally structured data files managed and accessible through any suitable type of application.

Often, within controlled-environment facilities, residents are not permitted to maintain payment methods commonly found outside the controlled-environment facility. For example, residents of a controlled-environment facility are required to forfeit any personal property including credit cards and personal checks upon entry into the controlled-environment facility. To this end, controlled-environment facility administration and management system 104, or similar functionality may maintain calling accounts, commissary account or other trust accounts for residents, employing database(s) 122, or the like.

The present systems and methods are particularly well adapted for providing automated resident check-ins using biometric identification. Embodiments of an automated check-in system for controlled-environment facility residents employ at least one biometric capture device, such as, by way of example, camera 118, 120, 124 disposed in a controlled-environment area, such as within illustrated housing area 126 of controlled-environment facility 102, configured to capture biometrics or other biometrics of residents of the controlled-environment facility in the controlled-environment area. Such biometrics may, as noted, variously include the resident's image, a recording of the resident's voice, a fingerprint scan, a thumbprint scan, a palm scan, an iris scan, or the like. In accordance with such embodiments of the present systems and methods controlled-environment facility administration and management system 104 may be configured to enroll key biometric identification features of residents of the controlled-environment facility. These enrolled key biometric features of residents of the controlled-environment facility may be stored in controlled-environment facility database 122, or the like. For example, in accordance with some embodiments of the present systems and methods, controlled-environment facility administration and management system 104 may use mug shots, fingerprint cards, or the like, of the residents of the controlled-environment facility to enroll key biometric identification features of residents of the controlled-environment facility.

As noted, in some embodiments at least one controlled-environment facility resident communications kiosk 110 and/or at least one personal controlled-environment facility resident media device 112 may be disposed in a controlled-environment area, such as in a resident housing area and may host (i.e. include) camera 118 or 120, or other biometric capture device or mechanism. One or more resident media devices 112 may, in accordance with embodiments of the present systems and methods, provide a mobile platform for biometric capture devices such as a camera, fingerprint reader, microphone or the like, such as may be used in various controlled-environment areas, such as work areas in or out of the controlled-environment facility, recreation areas in the controlled-environment facility, dining areas in the controlled-environment facility, or the like. Controlled-environment facility administration and management system 104 may employ controlled-environment facility resident communications kiosk 110 and/or personal controlled-environment facility resident media device 112 to carry out enrolling of key biometric identification features of residents of controlled-environment facility 102

Controlled-environment facility administration and management system 104 may compare captured biometrics of the residents to the enrolled key biometric features of residents to identify the resident in captured biometrics. Some embodiments controlled-environment facility resident communications kiosk(s) 110 and/or personal controlled-environment facility resident media device(s) 112 may be employed, such as, as a part of, or in conjunction with, controlled-environment facility administration and management system 104, to carry out the comparing of captured biometrics of the residents to enrolled key biometric features of residents of the controlled-environment facility to identify the resident.

Presence of the identified resident is logged as in the controlled-environment area, such as in illustrated housing area 126 of controlled-environment facility 102, at a time the biometrics of the identified resident were captured, as an automated check-in, which may be stored in database 122, or the like. This logging may be carried out by controlled-environment facility administration and management system 104. However, in some embodiments controlled-environment facility resident communications kiosk(s) 110 and/or personal controlled-environment facility resident media device(s) 112 may carry out the logging of presence of an identified resident as in the controlled-environment area at a time the biometrics of the identified resident were captured as a check-in, such as on controlled-environment facility administration and management system 104. This logging of the presence of the resident whose biometrics were captured as in the controlled-environment area may include logging other biometric information of the resident and the resident's physical location within the controlled-environment area, such as by a controlled-environment facility resident communications kiosk (110) and/or a personal controlled-environment facility resident media device (112).

In accordance with some embodiments, the biometric capture device(s) (e.g. camera(s) 118, 120 and/or 124) disposed within a controlled-environment area (housing area 126 of controlled-environment facility 102), and/or at least one other biometric capture device disposed in, or in conjunction with, the controlled-environment facility may capture biometrics of officers of controlled-environment facility 102. In such embodiments, controlled-environment facility administration and management system 104, or the like, may have enrolled key biometric features of officers of the controlled-environment facility, storing the enrolled key biometric identification features of officers of the controlled-environment facility in controlled-environment facility database 122, or the like. Controlled-environment facility administration and management system 104, or the like, may compare captured biometrics of an officer to enrolled key biometric features of officers of the controlled-environment facility to identify the officer, and log presence of a thus identified officer as being in the vicinity of the biometric capture device at a time the biometrics were captured (in database 122, or the like) for future reporting.

Figure 2:
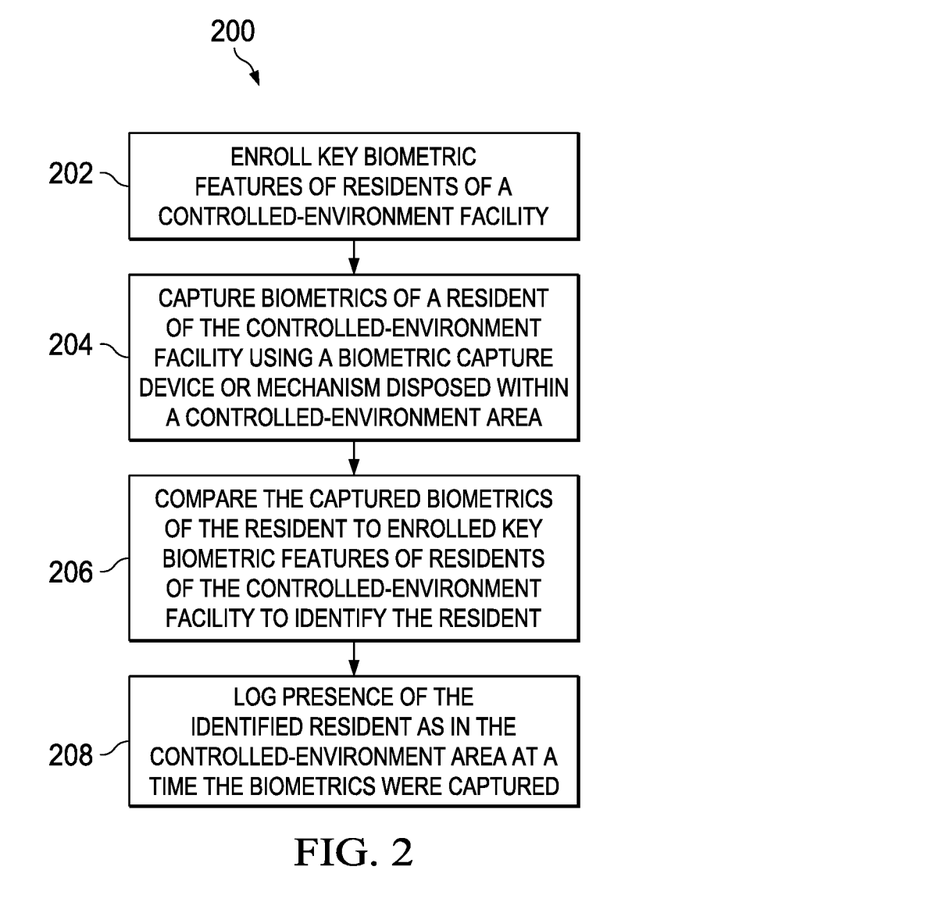
FIG. 2 is a flowchart of an example process for automated resident check-ins in controlled-environment areas using biometric identification, in accordance with some embodiments.

FIG. 2 is a flowchart of example process 200 for automated resident check-ins in controlled-environment areas using biometric identification, in accordance with some embodiments. This computer implemented method for automated check-in of controlled-environment facility residents, such as may be implemented by one or more controlled-environment facility systems, employs a biometric capture device (e.g. camera 118, 120, 124, etc.) disposed in a controlled-environment area (e.g. within a housing area 126 of a controlled-environment facility 102). At 202 key biometric features of residents of the controlled-environment facility are enrolled. This enrolling of key biometric features of residents of the controlled-environment facility may be is carried out using mug shots of the residents of the controlled-environment facility, and/or it may be a defined enrollment process. Regardless, the enrollment process may be carried out at intake of the resident into the controlled-environment facility. Alternatively (or additionally) the enrollment process may be automated and carried out by a controlled-environment facility resident communications kiosk (110) or a personal controlled-environment facility resident media device (112) which may also host at least one biometric capture device (e.g. camera 118, 120) disposed in the controlled-environment area.

Biometrics of a resident of the controlled-environment facility are captured at 204 using a biometric capture device or mechanism disposed in the controlled-environment area. Such biometrics may include the resident's image, a recording of the resident's voice, a fingerprint scan, a thumbprint scan, a palm scan, an iris scan, or the like. Capturing the biometrics of the resident of the controlled-environment facility may be carried out at 204 during a defined check-in procedure, wherein the resident provides a biometric sample, such as by presenting his or her face to a camera of kiosk or (his or her) resident device. This capturing of biometrics of residents of the controlled-environment facility at 204 using the biometric capture device disposed in a controlled-environment area may be carried out on a (more-or-less) continual basis At 206, the resulting captured biometrics of the resident is compared to enrolled key biometric features of residents of the controlled-environment facility to identify the resident. As noted, the biometric capture device or mechanism disposed in a controlled-environment area may be a part of a controlled-environment facility resident communications kiosk and/or a part of a personal controlled-environment facility resident media device (i.e. a mobile computing device). In such embodiments the controlled-environment facility resident communications kiosk and/or the personal controlled-environment facility resident media device may capture the biometrics at 204 and carry out comparison of resulting captured biometrics of the resident to enrolled key biometric features of residents of the controlled-environment facility to identify the resident at 206.

Regardless of the means of capture, presence of the resident whose biometrics were captured is logged at 208 as being in the controlled-environment area at a time the biometrics were captured with a controlled-environment facility administration and management system (104), as a check-in. Further, in embodiments where controlled-environment facility resident communications kiosk and/or the personal controlled-environment facility resident media device captures the biometrics at 204 and carries out comparing resulting captured biometrics of the resident to enrolled key biometric features of residents at 206, the controlled-environment facility resident communications kiosk and/or the personal controlled-environment facility resident media device may carry out the logging at 208. In such embodiments, the controlled-environment facility resident communications kiosk and/or the personal controlled-environment facility resident media device may log the resident's presence in the controlled-environment area, with the controlled-environment facility administration and management system, as a check-in.

Moreover, this logging of the presence of the resident whose biometrics were captured as in the controlled-environment area at 208 may include logging other biometric information of the resident (captured by the controlled-environment facility resident communications kiosk or a part of a personal controlled-environment facility resident media device). The resident's physical location within the controlled-environment area may also be logged at 208, such as at a particular controlled-environment facility resident communications kiosk or based on a (GPS, Wi-Fi, etc.) derived location of the personal controlled-environment facility resident media device. Where biometrics of residents of the controlled-environment facility are captured at 204 on a continual basis, logging presence of residents captured in the biometrics at 208 as being in the controlled-environment area may be carried out periodically, such as, as check-ins at predetermined times.

In accordance with embodiments of the present systems and methods a prompt may be issued for the resident to present his or her self before a biometric capture device face in front of the camera, or otherwise provide a biometric sample, in response to the resident not having a valid check-in logged within a predefined period, such as may be as defined by controlled-environment facility rules, such as may be administered by the controlled-environment facility administration and management system (104). This prompt may be an email, text, alarm, phone call, other electronic, optical or acoustic signals, etc., issued to a controlled-environment facility resident communications kiosk (110) in the controlled-environment area and/or a personal controlled-environment facility resident media device (112) of the resident in question. Additionally or alternatively, the prompt may (also) take the form of an announcement issued over a public address system of the controlled-environment facility. In accordance with some embodiments of the present systems and methods, such prompts may additionally or alternatively be issued at specified intervals, according to facility rules, to perform required check-ins. Further in this regard, concurrent with, in lieu of, or following an unheeded prompt for the resident to present his or herself before a biometric capture device, an alert may be issued, such as to a controlled-environment facility official, or the like, that facility rules for required check-ins have been violated with regard to the subject resident. This alert may be an email, text, alarm, phone call, or the like, issued to the controlled-environment facility official, or similar party.

An additional or alternative embodiment calls for enrolling key biometric features of officers of the controlled-environment facility and capturing a biometrics of an officer of the controlled-environment facility using a biometric capture device or mechanism disposed in, or in conjunction with, the controlled-environment facility. The resulting captured biometrics of the officer may then be compared to enrolled key biometric features of officers of the controlled-environment facility to identify the officer. Whereupon, presence of an identified officer may be logged as in the vicinity of the biometric capture device at a time the biometrics were captured. Reports of where the identified officer was at predetermined times (throughout the day) may be generated from these logs. Embodiments of the present systems and methods may also be used in emergencies to identify the last known location for a person in a controlled-environment facility. For example, during riots, this system could identify which officers were present in dangerous areas, and the like.

Figure 3:
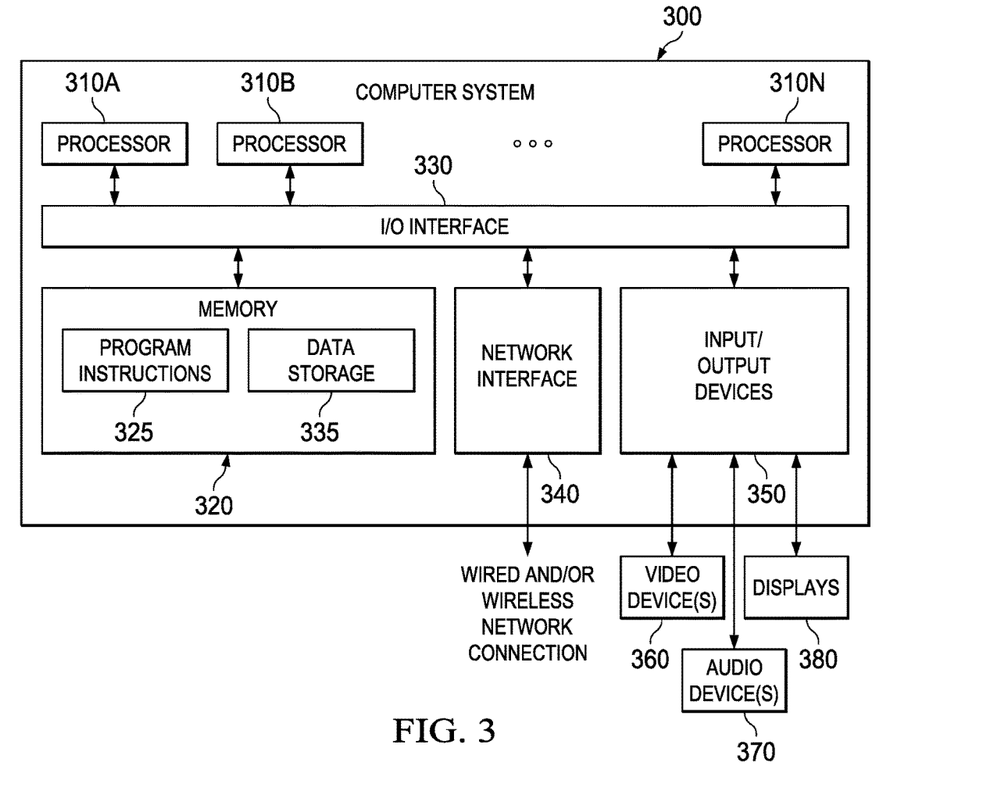
FIG. 3 is a block diagram of a computer system, device, station, or terminal configured to implement various techniques disclosed herein, according to some embodiments.

Various elements of the present systems and methods for automated resident check-ins in controlled-environment areas using biometric identification may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware. Thus, embodiments of the present systems and methods for automated resident check-ins in controlled-environment areas using biometric identification, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIGS. 1 and 2. A computer system such as computer system 300 may be a part of controlled-environment facility communications environment 100, such as a part of correctional facility inmate communications management system 106, which may include further components to provide the afore discussed communications functionality. A computer system such as computer system 300 may be used as part of correctional facility administration and management system 104, communications kiosk 110, personal inmate media devices 112, etc. In various embodiments two or more of these computer systems may be configured to communicate with each other in any suitable way, such as, for example, via a network, via a local area network, using wireless functionality and/or the like.

As illustrated, example computer system 300 includes one or more processors 310 coupled to a system memory 320 via an input/output (I/O) interface 330. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 3, above, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An automated check-in system for correctional facility inmates comprising:
   at least one biometric capture device disposed in a correctional facility controlled-environment area configured to capture biometrics of inmates of the correctional facility within the correctional facility controlled-environment area; and
   a correctional facility administration and management system configured to:
   enroll key biometric identification features of inmates of the correctional facility;
   compare captured biometrics of the inmates to enrolled key biometric identification features of inmates of the correctional facility to identify the inmate; and
   log presence of an identified inmate as in the correctional facility controlled-environment area at a time the biometrics of the identified inmate were captured; and
   issue a prompt for the inmate to present his or herself to the biometric capture device in response to the inmate not having a valid check-in logged within a predefined period.

2. The system of claim 1, wherein the correctional facility administration and management system is further configured to use mug shots of the inmates of the correctional facility to enroll key biometric identification features of inmates of the correctional facility.

3. The system of claim 1, further comprising at least one correctional facility inmate communications kiosk and/or at least one personal correctional facility inmate media device disposed within the correctional facility controlled-environment area and hosting the biometric capture device.

4. The system of claim 1, wherein the correctional facility administration and management system comprises, at least in part, at least one correctional facility inmate communications kiosk and/or at least one personal correctional facility inmate media device configured to carry out the enrolling of key biometric identification features of inmates of the correctional facility.

5. The system of claim 1, wherein the correctional facility administration and management system comprises, at least in part, at least one correctional facility inmate communications kiosk and/or at least one personal correctional facility inmate media device configured to carry out the comparing of captured biometrics of the inmates to enrolled key biometric identification features of inmates of the correctional facility to identify the inmate.

6. The system of claim 1, wherein the correctional facility administration and management system comprises, at least in part, at least one correctional facility inmate communications kiosk and/or at least one personal correctional facility inmate media device configured to carry out the logging of presence of an identified inmate as in the correctional facility controlled-environment area at a time the biometrics of the identified inmate were captured.

7. The system of claim 1, wherein the biometric capture device is a part of a correctional facility inmate communications kiosk or a part of a personal correctional facility inmate media device and logging presence of the inmate whose biometrics were captured as in the correctional facility controlled-environment area includes logging other biometric information of the inmate and the inmate's physical location within the correctional facility controlled-environment area.

8. The system of claim 1, wherein:
the at least one biometric capture device disposed within a correctional facility controlled-environment area and/or at least one other biometric capture device disposed in, or in conjunction with, the correctional facility is configured to capture biometrics of officers of the correctional facility; and
the correctional facility administration and management system is further configured to:
enroll key biometric identification features of officers of the correctional facility;
compare captured biometrics of an officer to enrolled key biometric identification features of officers of the correctional facility to identify the officer; and
log presence of a resultantly identified officer as being in the vicinity of the biometric capture device at a time the biometrics were captured.

9. A computer implemented method for automated check-in of correctional facility inmates implemented by one or more correctional facility systems, the method comprising:
enrolling key biometric features of inmates of the correctional facility;
capturing biometrics of an inmate of the correctional facility by a biometric capture device disposed within a correctional facility controlled-environment area;
comparing resulting captured biometrics of the inmate to enrolled key biometric features of inmates of the correctional facility to identify the inmate;
logging presence of the inmate whose biometrics were captured as in the correctional facility controlled-environment area at a time the biometrics were captured; and
issuing an alert if the presence of the inmate is not logged within a predetermined time.

10. The method of claim 9, wherein enrolling key biometric features of inmates of the correctional facility is carried out using mug shots of the inmates of the correctional facility.

11. The method of claim 9, wherein enrolling key biometric features of inmates of the correctional facility comprises a defined enrollment process.

12. The method of claim 11 wherein the defined enrollment process is carried out at an intake of the inmate into the correctional facility.

13. The method of claim 11 wherein the defined enrollment process is an automated enrollment carried out by a correctional facility inmate communications kiosk or a personal correctional facility inmate media device hosting the biometric capture device disposed within the correctional facility controlled-environment area of the correctional facility.

14. The method of claim 9, wherein the biometric capture device disposed within a correctional facility controlled-environment area is a part of a correctional facility inmate communications kiosk.

15. The method of claim 14, wherein the correctional facility inmate communications kiosk carries out comparing resulting captured biometrics of the inmate to enrolled key biometric features of inmates of the correctional facility to identify the inmate and logging presence of the inmate whose biometrics were captured as in the correctional facility controlled environment area, with a correctional facility administration and management system.

16. The method of claim 9, wherein the biometric capture device disposed within a correctional facility controlled-environment area is a part of a personal correctional facility inmate media device.

17. The method of claim 16, wherein the personal correctional facility inmate media device carries out comparing resulting captured biometrics of the inmate to enrolled key biometric features of inmates of the correctional facility to identify the inmate and logging presence of the inmate whose biometrics were captured as in the correctional facility controlled environment area, with a correctional facility administration and management system.

18. The method of claim 9, wherein capturing biometrics of an inmate of the correctional facility is carried out during a check-in procedure, comprising the inmate presenting his or herself to the biometric capture device.

19. The method of claim 18, wherein the biometric capture device is a part of a correctional facility inmate communications kiosk or a part of a personal correctional facility inmate media device and logging presence of the inmate whose biometrics were captured as in the correctional facility controlled-environment area includes logging other biometric information of the inmate and the inmate's physical location within the correctional facility controlled-environment area.

20. The method of claim 9, wherein capturing biometrics of inmates of the correctional facility using the biometric capture device disposed within a correctional facility controlled-environment area is carried out on a continual basis and logging presence of inmates captured in the biometrics as being in the correctional facility controlled-environment area is carried out periodically.

21. The method of claim 9, further comprising issuing a prompt for the inmate to present his or herself to the biometric capture device.

22. The method of claim 21, wherein the prompt is issued in response to the inmate not having a valid check-in logged within a predefined period.

23. The method of claim 21, wherein the prompt is issued at specified intervals according to correctional facility rules.

24. The method of claim 21, wherein the prompt is an email, text, alarm, and/or phone call issued to a correctional facility inmate communications kiosk in the correctional facility controlled-environment area and/or a personal correctional facility inmate media device of the inmate.

25. The method of claim 21, wherein the prompt is an announcement issued over a public address system of the correctional facility.

26. The method of claim 9, further comprising issuing an alert to an official associated with the correctional facility in response to facility rules for required check-ins being violated with regard to a subject inmate.

27. The method of claim 26, wherein the alert is an email, text, alarm, and/or phone call issued to the official.

28. The method of claim 9, further comprising:
- enrolling key biometric features of officers of the correctional facility;
- capturing biometrics of an officer of the correctional facility using a biometric capture device disposed in or in conjunction with the correctional facility;
- comparing resulting captured biometrics of the officer to enrolled key biometric features of officers of the correctional facility to identify the officer; and
- logging presence of an resultantly identified officer as in the vicinity of the biometric capture device at a time the biometrics were captured.

29. The method of claim 28 further comprising generating a report of where the identified officer was at predetermined times.

30. A non-transitory computer-readable storage medium having program instructions stored thereon that, upon execution by one or more correctional facility systems, cause the one or more correctional facility systems to:
- enroll key biometric features of inmates of the correctional facility;
- periodically capture biometrics of an inmate of the correctional facility by a biometric capture device disposed within a correctional facility controlled-environment area;
- compare resulting captured biometrics of the inmate to enrolled key biometric features of inmates of the correctional facility to identify the inmate; and
- log presence of the inmate whose biometrics were captured as in the correctional facility controlled-environment area at a time the biometrics were captured wherein the location of the inmate at the time the biometrics were captured is logged into storage.

* * * * *